US008688499B1

(12) United States Patent
Bose et al.

(10) Patent No.: US 8,688,499 B1
(45) Date of Patent: Apr. 1, 2014

(54) SYSTEM AND METHOD FOR GENERATING BUSINESS PROCESS MODELS FROM MAPPED TIME SEQUENCED OPERATIONAL AND TRANSACTION DATA

(75) Inventors: Abhijit Bose, Paramus, NJ (US); Edward Landa, Powder Springs, GA (US)

(73) Assignee: Google Inc., Mountain View, CA (US)

( * ) Notice: Subject to any disclaimer, the term of this patent is extended or adjusted under 35 U.S.C. 154(b) by 81 days.

(21) Appl. No.: 13/207,831

(22) Filed: Aug. 11, 2011

(51) Int. Cl.
*G06Q 10/00* (2012.01)

(52) U.S. Cl.
USPC ............................................. 705/7.27

(58) Field of Classification Search
USPC ............................................. 705/7.27
See application file for complete search history.

(56) References Cited

U.S. PATENT DOCUMENTS

| | | | | | |
|---|---|---|---|---|---|
| 5,630,069 | A | * | 5/1997 | Flores et al. | 705/7.27 |
| 5,734,837 | A | * | 3/1998 | Flores et al. | 705/7.13 |
| 6,278,977 | B1 | * | 8/2001 | Agrawal et al. | 705/7.27 |
| 6,446,061 | B1 | * | 9/2002 | Doerre et al. | 707/738 |
| 7,644,397 | B2 | * | 1/2010 | Warren et al. | 717/131 |
| 7,685,053 | B2 | * | 3/2010 | Graff | 705/37 |
| 7,685,083 | B2 | * | 3/2010 | Fairweather | 706/45 |
| 7,809,822 | B2 | * | 10/2010 | Gotta et al. | 709/223 |
| 7,908,365 | B2 | * | 3/2011 | Sengupta et al. | 709/224 |
| 7,912,946 | B2 | * | 3/2011 | Sengupta et al. | 709/224 |
| 7,949,619 | B2 | * | 5/2011 | Narayanaswamy et al. | 706/12 |
| 8,041,669 | B2 | * | 10/2011 | Nigam et al. | 706/55 |
| 8,050,952 | B2 | * | 11/2011 | Busch et al. | 705/7.11 |
| 8,073,731 | B1 | * | 12/2011 | Rajasenan | 705/7.42 |
| 8,108,234 | B2 | * | 1/2012 | Suenbuel et al. | 705/7.11 |
| 8,126,753 | B2 | * | 2/2012 | Anerousis et al. | 705/7.11 |
| 8,126,874 | B2 | * | 2/2012 | Sercinoglu et al. | 707/721 |
| 8,160,920 | B2 | * | 4/2012 | Gerke et al. | 705/7.36 |
| 8,175,991 | B2 | * | 5/2012 | Narayanaswamy et al. | 706/45 |
| 8,180,778 | B1 | * | 5/2012 | Pedersen et al. | 707/739 |
| 8,209,672 | B2 | * | 6/2012 | Ivanov | 717/136 |
| 8,296,117 | B2 | * | 10/2012 | Narayanaswamy et al. | 703/13 |
| 2005/0171833 | A1 | * | 8/2005 | Jost et al. | 705/10 |
| 2006/0143231 | A1 | * | 6/2006 | Boccasam et al. | 707/104.1 |
| 2006/0184410 | A1 | * | 8/2006 | Ramamurthy et al. | 705/8 |
| 2006/0242180 | A1 | * | 10/2006 | Graf et al. | 707/101 |
| 2007/0021995 | A1 | * | 1/2007 | Toklu et al. | 705/7 |
| 2007/0055558 | A1 | * | 3/2007 | Shanahan et al. | 705/7 |

(Continued)

FOREIGN PATENT DOCUMENTS

WO    WO 03/034287    *   7/2003   ............. G06F 17/40

OTHER PUBLICATIONS

Weitjers, A.J.M.M. et al., Rediscovering Workflow Models from Event-Based Data Using Little Thumb Journal of Integrated Computer-Aider Engineering Archive, vol. 10, No. 2, Apr. 2003.*

(Continued)

*Primary Examiner* — Scott L Jarrett

(74) *Attorney, Agent, or Firm* — Lerner, David, Littenberg, Krumholz & Mentlik, LLP

(57) ABSTRACT

The present invention pertains to generating workflows using operational data, and mapping the operational data to the flow. Systems and methods are provided to receive operational data from networked devices, process the data to determine tasks performed and timing associated therewith, and output the analysis in the form of a workflow. Metrics measuring work volume, productivity, and the like may also be calculated using the operational data, and mapped to the flow. Generation of the workflow may be fully automated, or may request input from a user.

19 Claims, 9 Drawing Sheets

(56) References Cited

U.S. PATENT DOCUMENTS

| | | | |
|---|---|---|---|
| 2007/0276714 A1* | 11/2007 | Beringer | 705/7 |
| 2008/0183479 A1* | 7/2008 | Iwashita et al. | 705/1 |
| 2008/0228536 A1* | 9/2008 | Suenbuel et al. | 705/7 |
| 2008/0228546 A1* | 9/2008 | Yanase | 705/8 |
| 2008/0229296 A1* | 9/2008 | Kanai | 717/154 |
| 2008/0312992 A1* | 12/2008 | Hoshi et al. | 705/7 |
| 2009/0076877 A1* | 3/2009 | Yano et al. | 705/8 |
| 2009/0138425 A1* | 5/2009 | Narayanaswamy et al. | 706/48 |
| 2009/0157419 A1* | 6/2009 | Bursey | 705/1 |
| 2009/0182856 A1* | 7/2009 | Gotta et al. | 709/223 |
| 2009/0193111 A1* | 7/2009 | Sengupta et al. | 709/224 |
| 2009/0198481 A1* | 8/2009 | Narayanaswamy et al. | 703/13 |
| 2009/0198533 A1* | 8/2009 | Narayanaswamy et al. | 705/7 |
| 2009/0198639 A1* | 8/2009 | Narayanaswamy et al. | 706/48 |
| 2010/0042745 A1* | 2/2010 | Maeda et al. | 709/242 |
| 2010/0082333 A1* | 4/2010 | Al-Shammari | 704/10 |
| 2010/0174583 A1* | 7/2010 | Passova et al. | 705/10 |
| 2011/0082716 A1* | 4/2011 | Bhamidipaty et al. | 705/7.11 |
| 2011/0093293 A1* | 4/2011 | G. N. et al. | 705/3 |
| 2011/0161132 A1* | 6/2011 | Goel et al. | 705/7.26 |

OTHER PUBLICATIONS van Dongen, Boudewijn F. et al., EMit: A Process Mining Tool ICAPTN, 2004.*

Cook, Jonathan E. et al., Discovery and Validation of Processes Proceedings of the NSF Workshop of Workflow and Process Automation, May 1996.* van der Aalst, W.M.P. et al., Workflow Mining: A Survey of Issues and Approaches Data and KNolwedge Engineering, vol. 47, No. 2, 2003.* van der Aalst, Wil M. P., Process Mining in CSCW Systems The 9$^{th}$ International Conference on Computer Supported Cooperative Work in Design Proceedings, Apr. 2007.*

Zhang, Ping et al., Discovery, Visualization and Performance Analysis of Enterprise Workflow Computational Statistics and Data Analysis, vol. 51, No. 5, Feb. 2007.*

Dustdar, Schahram et al., Discovering web service workflows using web services interation mining International Journal Business Process Integration and Management, vol. 1, No. 4, 2006.*

Friedrich, Fabian et al., Process Model Generation from Natural Language Text CAiSE 2011, Jun. 2011.*

Buffett, Scott et al., Using Classificaiton Methods to Label Tasks in Process Mining Journal of Software Maintenance and Evolution, vol. 22, No. 6-7, Sep. 2010.*

Ghose, Aditya et al., Process Discovery from Model and Text Artefacts IEEE Congress on Services, 2007.*

Cook, Jonathan et al., Discovering Models of Software Processes from Event-Based Data ACM, 1998.*

Herbst, Joachim et al., Workflow mining with InWoLve Computers in Industry, vol. 53, 2004.*

SAS Text Miner SAS Institute, Inc., White Paper, 2002.*

Tiwari, A. et al., A review of business process mining: state of the art and future trends Business Process Management Journal, vol. 14, No. 1, 2008.*

Thiel, Kilian, The KNIME Text Processing Plugin http://www.knime.org, 2009.* van der Aalst, W.M.P. et al., ProM: The Process Mining Toolkit ProcessMining.org, 2009.*

Schimm, Guido, Process Miner—A Tool for Mining Process Schemes frm Event-Based Data JELIA, 2002.* van der Aalst, W.M. P. et al., Process mining: a research agenda Computers in Industry, vol. 53, 2004.* van der Aalst, W.M. P, et al., Workflow Patterns Distributed and Parallel Databases, vol. 14, No. 1, 2003.*

Li et al., A policy-based process mining framework: mining business policy texts for discovering process models Information Systems E-Business Management, vol. 8, 2010.*

Jeffrey Dean and Sanjay Ghemawat, MapReduce: Simplified Data Processing on Large Clusters, 2004, 13 pages.

* cited by examiner

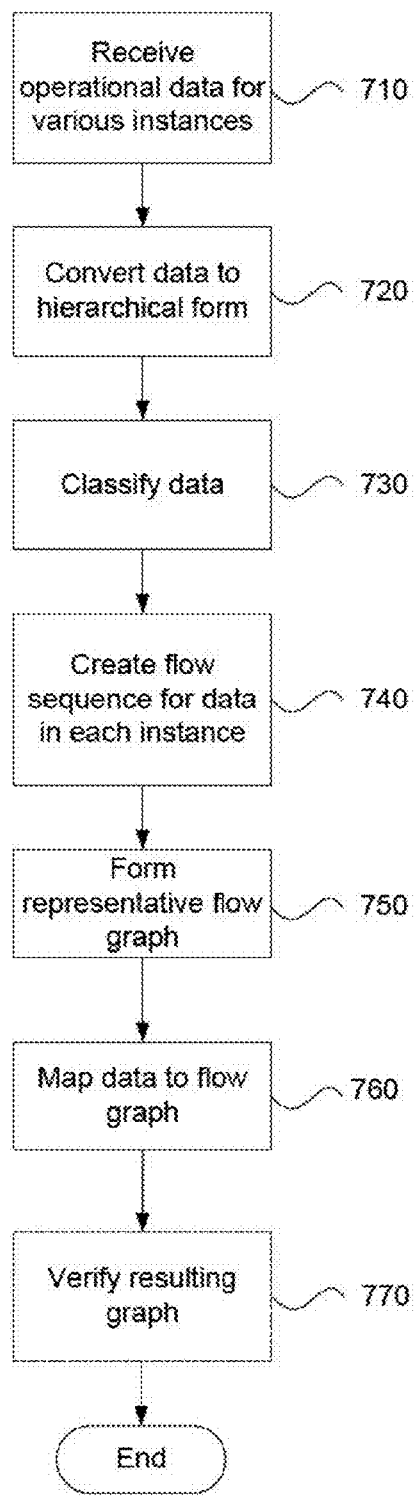

US 8,688,499 B1

SYSTEM AND METHOD FOR GENERATING BUSINESS PROCESS MODELS FROM MAPPED TIME SEQUENCED OPERATIONAL AND TRANSACTION DATA

BACKGROUND

Enterprises, such as corporations, may need to ascertain how systems and processes within the enterprise operate, for example, in order to ensure that resources are being used efficiently and to comply with regulatory requirements. Accordingly, the enterprise may generate a workflow identifying a sequence of operations that are performed within a process. Depending on a size of the enterprise, there may be thousands of processes being orchestrated at any given time within the enterprise. Each process may require its own workflow. Thus, constructing workflows for a larger enterprise can be very time consuming. Moreover, these processes and accompanying workflows can generate very large volumes of data requiring terabytes and even petabytes of storage, and also requiring complex and expensive systems to process the volumes of data for business intelligence.

Most processes either consume or generate artifacts such as tickets, work orders, service requests, transaction logs, electronic trails and other types of records. These records may be collected and used for calculation of metrics, such as work volumes, quality, productivity, etc. However, these records may be most useful when they are mapped to relevant portions of the workflow. For example, such process maps may be needed to measure individual process steps and transactions, determine compliance with predefined procedures, and monitor individual and group performance. However, mapping these records to the relevant steps of the workflow can be extremely time and resource intensive.

SUMMARY OF THE INVENTION

Systems and methods of generating workflows using operational data are provided. For example, one aspect of the invention provides a method of generating workflows, comprising receiving operational data relating to one or more instances, and identifying within the operational data information indicating at least one operation being performed for each instance. This method further comprises determining, using a processor, timing information associated with the at least one operation, generating, using the processor, a flow model based on the information indicating the operation being performed and the associated timing information, mapping, using the processor, the operational data to the flow model, and outputting the flow model. Generating the flow model may further comprise generating an individual flow model for each instance, and combining the individual flow models to form a representative flow model. Additionally, metrics related to the at least one operation may be generated and mapped to the flow model.

Another aspect of the invention provides a system for generating workflows from operational data, comprising a processor and a memory storing operational data relating to one or more instances, and instructions executable by the processor. The instructions may include identifying within the operational data information indicating at least one operation being performed, determining timing information associated with the at least one operation, generating a flow model based on the information indicating the operation being performed and the associated timing information, and mapping the operational data to the flow model. The instructions may further comprise generating metrics related to the at least one operation, and mapping the metrics to the flow model.

Yet another aspect of the invention provides a non-transitory computer-readable storage medium comprising instructions that, when executed by a computer processor, cause the processor to perform a method. This method may comprise receiving operational data relating to one or more instances, identifying within the operational data information indicating at least one operation being performed for each instance, and determining timing information associated with the at least one operation. Further, the method may comprise generating a flow model based on the information indicating the operation being performed and the associated timing information, mapping the operational data to the flow model, and outputting the flow model.

BRIEF DESCRIPTION OF THE DRAWINGS

FIG. 7 illustrates a method in accordance with aspects of the present invention.

DETAILED DESCRIPTION

The aspects, features and advantages of the present invention will be appreciated when considered with reference to the following description of preferred embodiments and accompanying figures. The same reference numbers in different drawings may identify the same or similar elements. Furthermore, the following description does not limit the present invention. Rather, the scope of the invention is defined by the appended claims and equivalents.

The present invention is very flexible and is suitable for use in many applications, including analysis of operations performed using computers in a network. For instance, a system in accordance with aspects of the invention may be used to evaluate proposed implementations to existing processes and modifications to existing processes. The processing pipelines described in the invention can scale with resources (e.g., many thousands of CPUs and disk drives) to analyze very large amounts of data.

Figure 1:
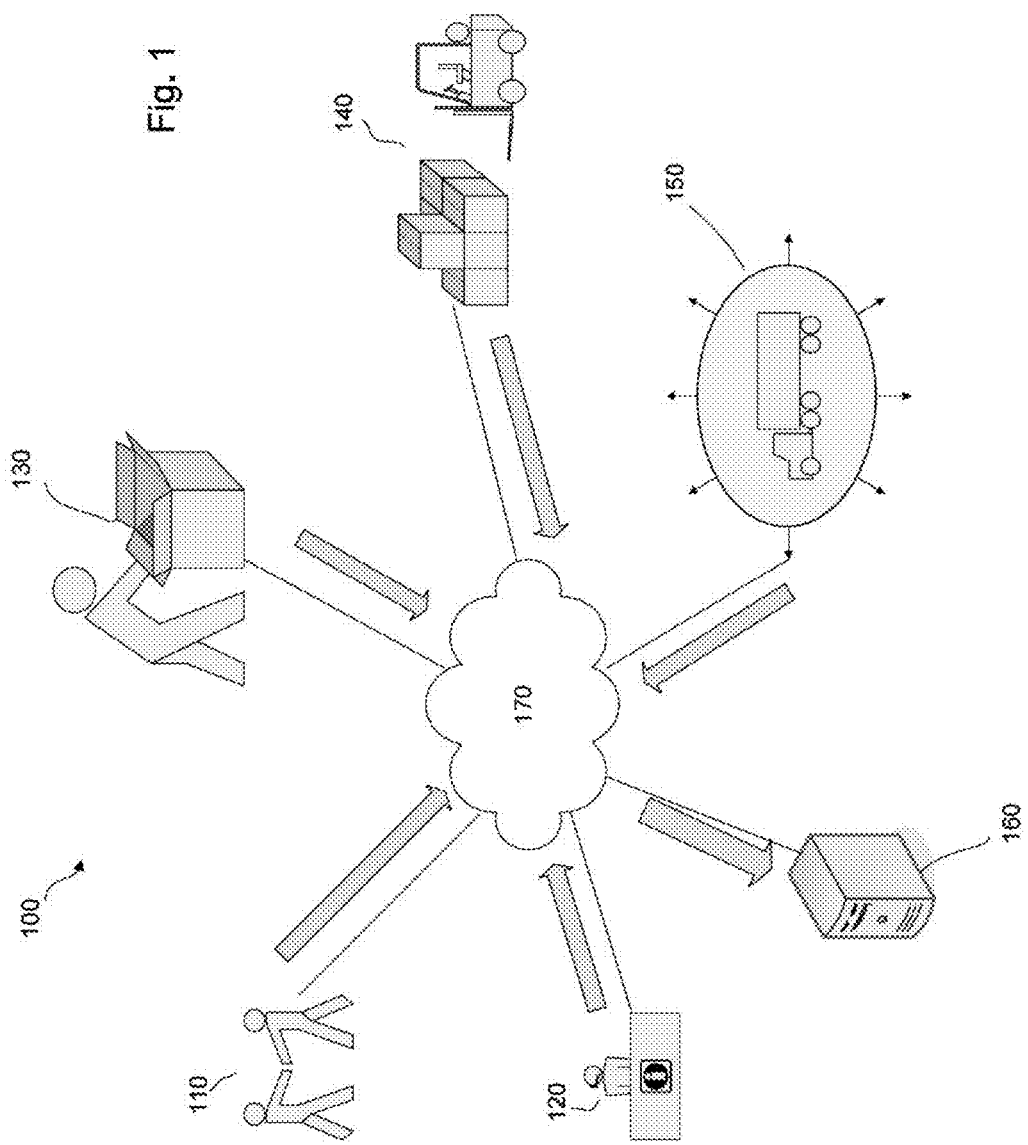
FIG. 1 illustrates an exemplary network in accordance with one embodiment of the present invention.

An exemplary embodiment is illustrated in FIG. 1. An enterprise 100 includes a number of different departments, including many workers utilizing various devices. For example, the enterprise 100 may include a sales department 110, a customer service department 120, a packing and shipping department 130, a warehouse 140, and a distribution department 150. It should be understood that while only the departments 110-150 are shown and discussed herein, any number and variety of departments or work groups may be used.

Some or all of the departments 110-150 may be interconnected. For example, as shown in FIG. 1, the departments 110-150 may be interconnected via network 170. Alternatively, at least some of the departments may be directly connected to each other while others remain connected through the network 170. Additionally, devices within each department may be directly connected to one another and/or connected through the network 170.

Also connected to the network 170 is server 160. The server 160 may mine data from any or all of the devices within the departments 110-150, as will be explained in further detail below. The structure of the server is described in greater detail with respect to FIG. 3.

Each department 110-150 may include a number of workers utilizing various devices, such as telephones (digital telephones, mobile phones, etc.), PCs (e.g., desktop computers, laptop computers, netbooks, tablet PCs, personal digital assistants (PDAs), etc.), fax machines, scanners, bar-code scanners, and the like. For example, as shown in example 200 of FIG. 2, workers in the sales department 110 may communicate over network 270 using a tablet computer 212. The customer service department 120 may utilize workstations including a server 220, display 224, inputs 226 (e.g., keyboard, mouse), and multipurpose device 222 (e.g., printer/scanner/fax). The shipping department may utilize laptop computers 232, computer terminals 234, and barcode scanners (not shown). The warehouse 140 may utilize smartphones 242, servers 240, and desktop computers 244. The distribution department 150 may utilize PDAs 252 and GPS navigation systems (not shown). It should be understood that these devices are merely exemplary, and that any department 110-150 may utilize any number or variety of devices to perform their required operations. These devices 212-252 may be directly or indirectly linked to the server 160, for example, through the network 170. For example, while the smartphone 242 in the customer service department 140 is shown as being directly connected to the network, the desktop computer 244 is directly connected to the server 240 via connection 208, and therefore indirectly connected to the network 270. However, all of these devices are connected to server 260, which is also connected to the network 270.

The server 260 may mine operational data from the devices 212-252 as the workers within the departments 110-150 perform their respective tasks. For example, as operations are executed, artifacts may be consumed or generated. Examples of these artifacts may include work orders, transaction logs, tickets, electronic trails, or any other type of record. The server 160 may receive these artifacts, either periodically or as they are generated. Further, the server 260 itself may be distributed over a large number of physical resources depending on the volume of data.

The artifacts may contain a mix of timestamps, text messages, structured fields, file attachments, or the like. The timestamps may be available at different granularities, depending on how the artifacts are generated. For example, a timestamp may be placed in the artifacts as each step is completed, or it may be placed at the end of several steps related to a transaction.

The server 260 may also process the artifacts. For example, the server 260 may use the received artifacts to calculate metrics, such as work volumes, quality, and productivity. The artifacts may also be used to generate a workflow of the operations of the enterprise 100. For example, text and other data within the artifacts may be processed and analyzed so that a most common sequence of events is identified. This process may be automated or semi-automated. According to one aspect, the artifacts or the metrics may be mapped to the relevant steps of a process in the workflow.

Figure 2:
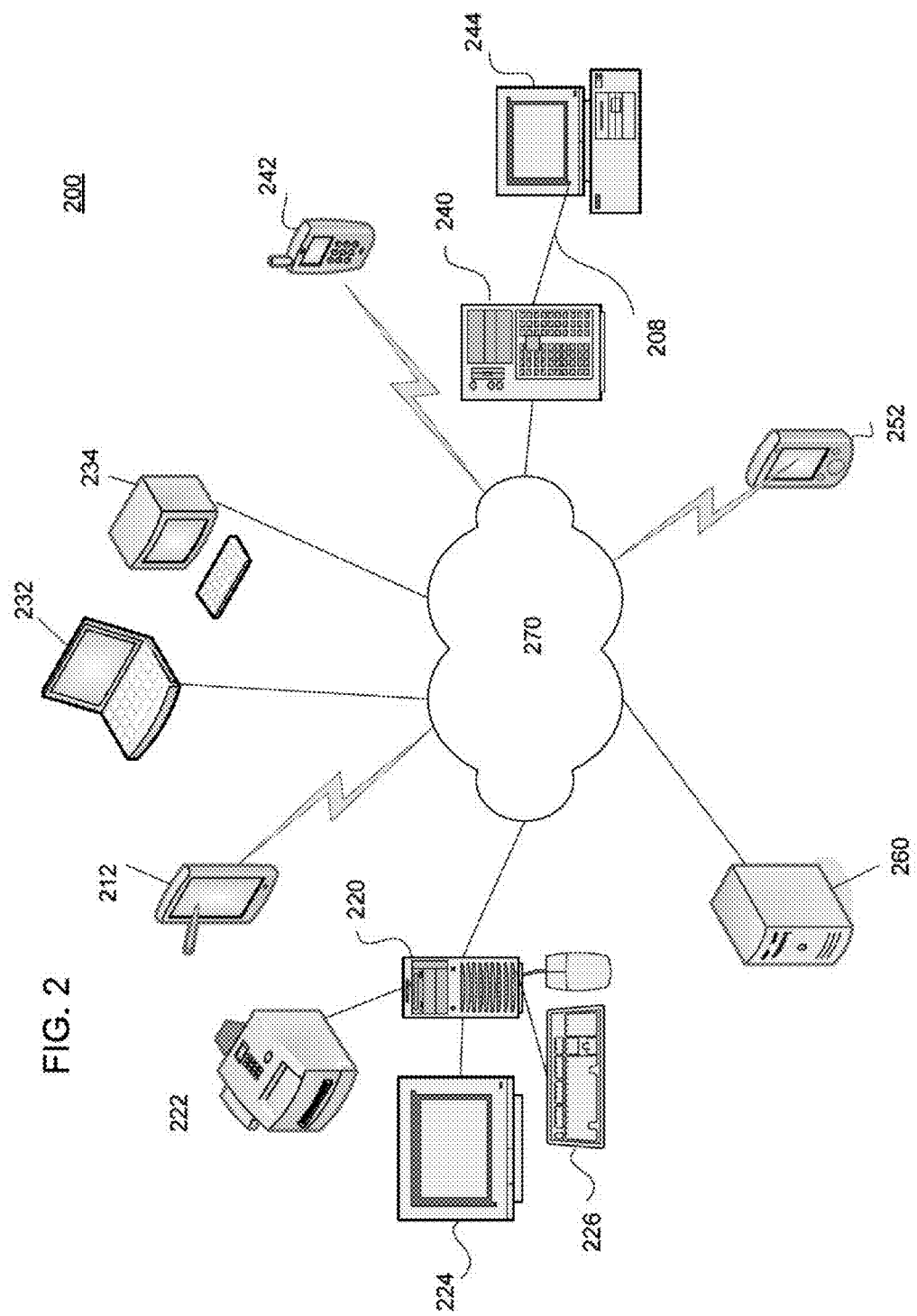
FIG. 2 illustrates an exemplary network in accordance with another embodiment of the present invention.

The illustrations of FIGS. 1 and 2 assume a centralized data processing architecture, where all of the data processing is performed at the server 160, 260. However, a distributed data processing architecture may be more efficient in mining and processing operational data to generate workflows. For example, the server 160 may be replaced with a plurality of computing devices. Alternatively or additionally, data processing may be performed at one or more of the client devices 212-252 within the departments 110-150.

Figure 3:
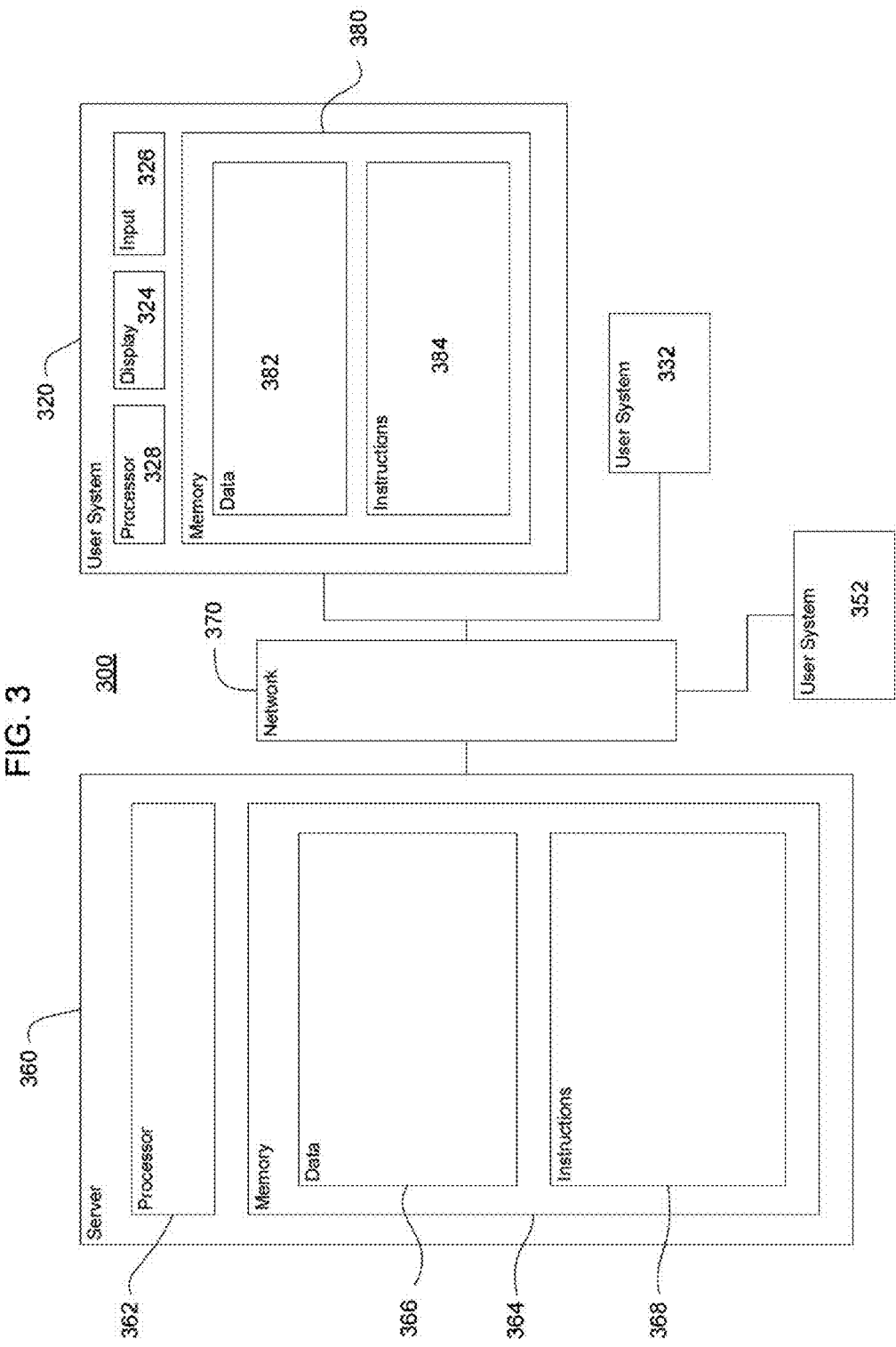
FIG. 3 illustrates a system in accordance with an aspect of the present invention.

FIG. 3 is a schematic diagram of a computer system depicting various computing devices that can be used alone or in a networked configuration in accordance with aspects of the present invention. For example, this figure illustrates a computer network 300 that includes a plurality of computers 320, 332, 352, and 360. The computer processing systems may be interconnected via a local or direct connection or may be coupled via a communications network 370 such as a LAN, WAN, the Internet, etc. and which may be wired or wireless.

Each computer processing system can include, for example, one or more computing devices having user inputs 326 (e.g., keyboard, mouse, pen-inputs, joysticks, buttons, touch screens, etc.), as well as a display 324, which could include, for instance, a CRT, LCD, plasma screen monitor, TV, projector, etc.

Each computer 320, 332, 352, and 360 may be a personal computer, server, etc. By way of example only, computers 320, 332, and 352 may be personal computers while computer 360 may be a server. For example, network 300 may include server 360 containing a processor 362, memory 364 and other components typically present in a computer.

Memory 364 stores information accessible by processor 362, including instructions 368 that may be executed by the processor 362 and data 366 that may be retrieved, manipulated or stored by the processor 362. The memory 364 may be of any type capable of storing information accessible by the processor 362, such as a hard-drive, ROM, RAM, CD-ROM, write-capable or read-only memories.

The processor 362 may comprise any number of well known processors, such as processors from Intel Corporation. Alternatively, the processor may be a dedicated controller for executing operations, such as an ASIC.

The instructions 368 may comprise any set of instructions to be executed directly (such as machine code) or indirectly (such as scripts) by the processor. In that regard, the terms "instructions," "steps" and "programs" may be used interchangeably herein. The instructions may be stored in any computer language or format, such as in object code or modules of source code. The functions, methods and routines of instructions in accordance with the present invention are explained in more detail below.

Data 366 may be retrieved, stored or modified by processor 362 in accordance with the instructions 368. The data may be stored as a collection of data. For instance, although the invention is not limited by any particular data structure, the data may be stored in computer registers, in a relational database as a table having a plurality of different fields and records, XML documents, or flat files.

The data 366 may also be formatted in any computer readable format such as, but not limited to, binary values, ASCII or EBCDIC (Extended Binary-Coded Decimal Interchange Code). Similarly, the data may include images stored in a variety of formats such as vector-based images or bitmap images using lossless (e.g., BMP) or lossy (e.g., JPEG) encoding. Moreover, the data may include any information sufficient to identify the relevant information, such as descriptive text, proprietary codes, pointers, references to data stored in other memories (including other network locations) or information which is used by a function to calculate the relevant data.

Although the processor 362 and memory 364 are functionally illustrated in FIG. 3 as being within the same block, it will be understood that the processor and memory may actually comprise multiple processors and memories that may or may not be stored within the same physical housing or location. For example, some or all of the instructions 368 and data may be stored on a removable CD-ROM and others within a read-only computer chip. Some or all of the instructions and data may be stored in a location physically remote from, yet still accessible by, the processor. Similarly, the processor 362 may actually comprise a collection of processors which may or may not operate in parallel. Data 366 may be distributed and stored across multiple memories such as hard drives or the like.

In one aspect, server 360 communicates with one or more client computers 320, 332, 352. Each client computer may be configured similarly to the server 360, with a processor, memory and instructions, as well as one or more user input devices and a user output device, such as display. Each client computer may be a general purpose computer, intended for use by a person, having all the components normally found in a personal computer such as a central processing unit ("CPU") 328, display 324, CD-ROM, hard-drive, mouse, keyboard, touch-sensitive screen, speakers, microphone, modem and/or router (telephone, cable or otherwise) and all of the components used for connecting these elements to one another.

The server 360 and client computers 320, 332, 352 are capable of direct and indirect communication with other computers, such as over network 370. Although only a few computers are depicted in FIG. 3, it should be appreciated that a typical system can include a large number of connected servers and clients, with each different computer being at a different node of the network. The network 370, and intervening nodes, may comprise various configurations and protocols including the Internet, intranets, virtual private networks, wide area networks, local networks, private networks using communication protocols proprietary to one or more companies, Ethernet, WiFi and HTTP.

Communication across the network, including any intervening nodes, may be facilitated by any device capable of transmitting data to and from other computers, such as modems (e.g., dial-up or cable), network interfaces and wireless interfaces. According to one aspect, server 360 may be a web server. Although certain advantages are obtained when information is transmitted or received as noted above, other aspects of the invention are not limited to any particular manner of transmission of information. For example, in some aspects, the information may be sent via a medium such as a disk, tape, CD-ROM, or directly between two computer systems via a dial-up modem. In other aspects, the information may be transmitted in a non-electronic format and manually entered into the system.

Moreover, computers in accordance with the systems and methods described herein may comprise any device capable of processing instructions and transmitting data to and from humans and other computers, including network computers lacking local storage capability, PDA's with modems and Internet-capable wireless phones.

Figure 4:
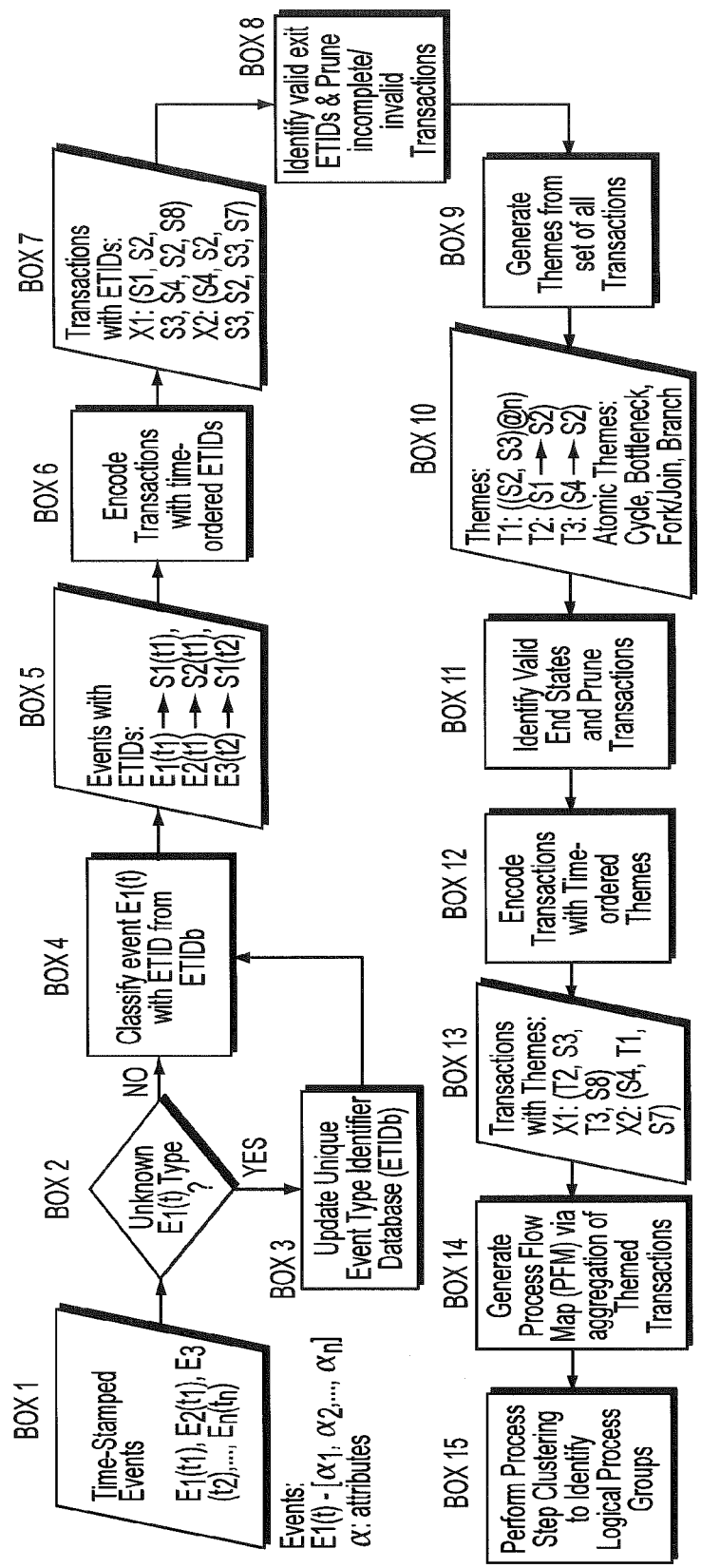
FIG. 4 is a flow diagram in accordance with aspects of the invention.

FIG. 4 illustrates a logic flow according to an aspect of the technology.

Box 1 represents raw data that may be processed according to aspects of the technology. The raw data relates to one or more events, where an event may be any occurrence in the course of business of a company. For example, in an entity which deals in the sale of automobile parts, the events may include "receive email order," "receive phone order," "submit credit card payment," "receive credit payment confirmation," "check stock for rim," "ship tire," "ship steering wheel," "ship engine," etc. The events may be time-stamped, and thus an order in which the events occurred may be determined.

In Box 2, it is determined whether a type of the event is known or unknown. For example, a system according to the technology may maintain a database of event type identifiers (ETIDs). The ETIDs may be numbers or any other type of indicia. If the event type is unknown, the flow proceeds to Box 3, where the database is updated to include the new ETID. If the event type is known, the flow proceeds to Box 4, where an ETID from the database is assigned to each type of raw data. Continuing the example above, "receive email order" and "receive phone order" may both be identified as "receive order. "Submit credit card payment" and "receive credit payment confirmation" may be classified by an ETID for "process payment." "Ship tire," "ship steering wheel," and "ship engine" may all be classified using an ETID for "ship part." The classified events may be considered steps in a process. Box 5 illustrates the data as processed in Box 4. For example, various events are classified as steps S1, S2, etc.

In Box 6, the ETIDs are used to encode transactions. For example, the timestamps associated with each event may be used to determine an order in which the events occurred. Accordingly, an exemplary set of transactions, shown in Box 7, may include a sequence of ETIDs in an order in which the events occurred. These transactions may represent actual business transactions within an entity, such as all the steps involved in receiving and fulfilling a particular customer order for an automobile part.

Some of the transactions encoded in Box 6 may be incomplete. For example, in a transaction fulfilling an order for a set of wheels, the transaction is incomplete if the last ETID in the sequence corresponds to "check inventory." Rather, the sequence should end in an ETID corresponding to "ship part." Accordingly, in Box 8, valid ending ETIDs may be identified, and incomplete transactions may be pruned (e.g., stored in a different portion of memory). This may be performed using any of a number of algorithms. Alternatively or additionally, this may involve human intervention.

In Box 9, themes are generated from the set of transactions, for example, to encode the transactions more efficiently. Examples of themes may include Cycle, Bottleneck, Forks, Join, and Branch (see Box 10), or longer sequences, including complete transactions. Accordingly, invalid transactions may be pruned (Box 11) and the transactions may be encoded with time-ordered themes (Box 12). For example, a cycle may be a repetition of two or more steps. Rather than encoding a transaction X2 including a cycle as X2: {S4, S2, S3, S2, S3, S7}, a theme T1 for the cycle may be defined as T1: {(S2,S3)@n}, and therefore the transaction may be encoded as X2:{S4, T1, S7}, as shown in Box 13.

In encoding the transactions with the themes, it may be determined which attributes are useful for measuring theme similarity. This information may be used to compare and cluster transactions. For example, according to one aspect, weights may be assigned to each attribute of themes in proportion to the number of events represented by the item. Calculations regarding frequency of a given theme may also be collected across the corpus of transactions.

Theme data may be generated using parallel processing of all transactions. For example, the events and transactions may be distributed across a set of processors, and processed independently of each other or in groups. The results may be aggregated, for example, for each ETID. Examples of implementations of such parallel processing include MapReduce.

In Box 14, a process flow map (e.g., the flow 600 of FIG. 6A), may be generated from the transactions. According to one aspect, the artifacts used to create the flow may be mapped to the flow, such that a user viewing the flow may also view one or more of the events involved therein. According to another example, such mapping may also enable the user to view computations relative to the artifacts or process flow (e.g., number of order forms, average time to reach a given stage in the process flow, etc.).

In Box 15, process steps may be clustered to identify logical process groups. Keeping with the example of FIG. 6A, nodes 610 and 620 may be grouped as sales-related events, nodes 630-650 may be grouped as warehouse events, and nodes 660-670 may be grouped as shipping events. Such clustering may be used to graphically display the transaction more efficiently, or to identify where data should be sent for review. For example, such clustering may indicate that data related to nodes 630-650 should be sent to a warehouse manager.

Figure 5:
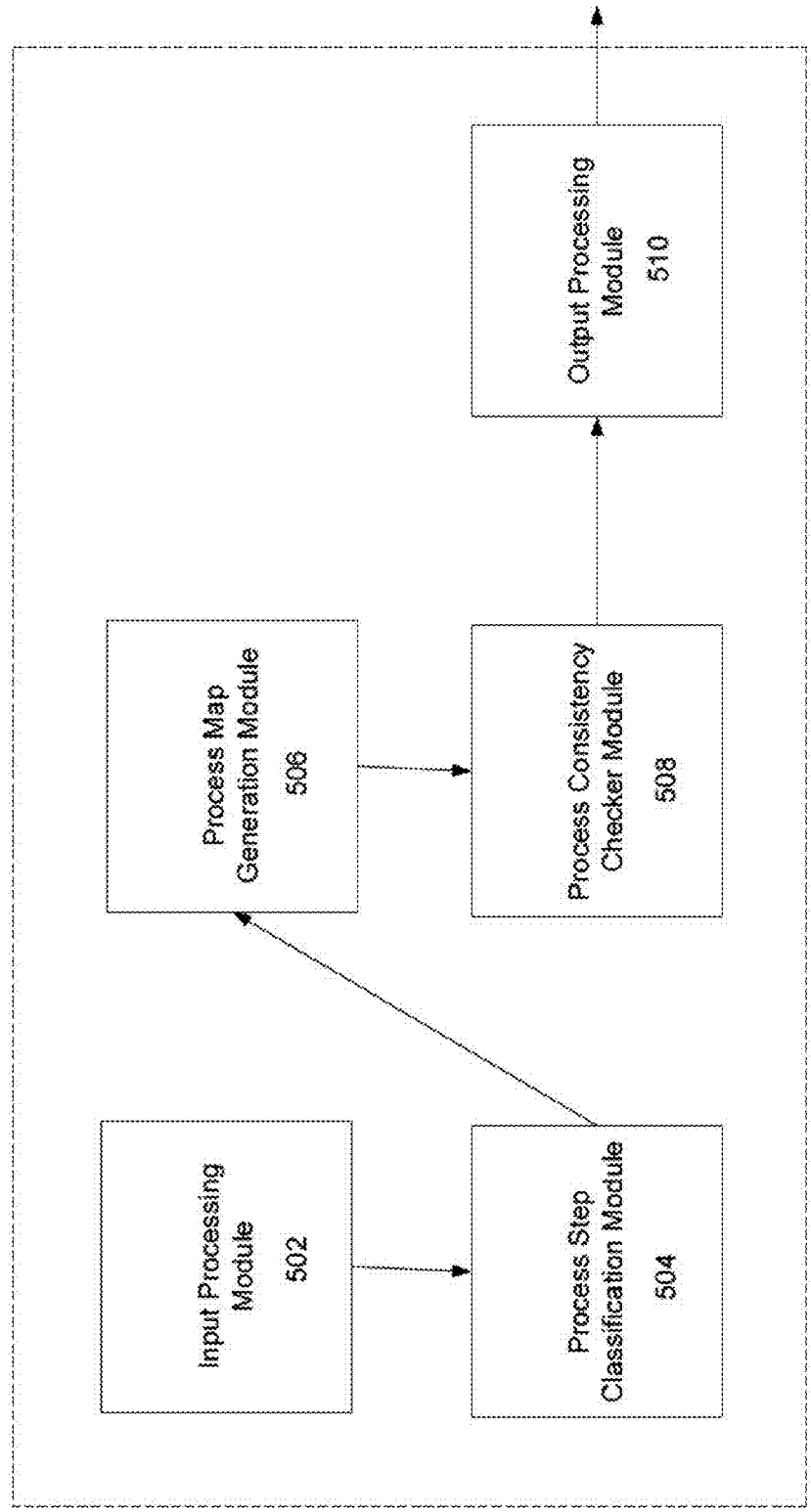
FIG. 5 illustrates a system in accordance with another aspect of the present invention.

FIG. 5 presents an exemplary system 500 illustrating functional modules in accordance with an embodiment of the invention. As shown, the functional modules may include an input processing module 502, a process step classification module 504, a process map generation module 506, a process consistency checker module 508, and an output processing module 510. The modules may be implemented in software and/or hardware and may be distributed among one or more of the computers 212-260 of FIG. 2. Together, these modules may process artifacts corresponding to an event. An event may be any step in a transaction. For example, if the transaction is servicing a customer's automobile, events may include receiving an order from the customer, changing the oil, checking other vehicle diagnostics, and receiving payment. Each event may be documented in one or more records.

The input processing module 502 reformats operational data. For example, the input processing module may transform each record (e.g. a service request, a ticket, a transaction, etc.) into a hierarchical form including (i) structured elements, (ii) a time-ordered sequence of text segments added to the record over its lifetime, and (iii) tokenizing text segments via a stemming algorithm. A stemming algorithm may reduce words to their roots or base forms. This may occur, for example, when the input records contain human-entered text. For example, text sequences "Parts will be shipped tomorrow" and "Parts are shipping tomorrow" semantically mean the same thing. A stemmer may reduce "shipping" and "shipped" to the stem "ship".

The structured elements may be structure fields within the record, such as location, priority, type of ticket, etc. For example, if the input record is a work order for service to a motor vehicle, the structured data fields may include document type, vehicle type, location, name of service technician, parts required, and invoice amount.

The time ordered sequence of text segments, using the same example, may include a first set of text added by a person with whom the order was placed (e.g., a description by the customer of why the vehicle is not working properly and a request for service), a second set of text later added by the service technician (e.g., indicating the vehicle diagnosis, which parts were installed, and noting any additional problems with the vehicle), and a third set of text added by a store clerk (e.g., that the invoice was paid and the payment type).

These time-ordered text sequences may undergo stemming and other processing steps (e.g., to remove commonly occurring words known as stop words) before they are input to the classification module 504.

The process step classification module 504 takes the time-ordered text sequences from the input processing module 502 and classifies the contents of text into themes. (See, e.g., Boxes 9-10 of FIG. 4). According to one aspect, the process step classification module 504 analyzes all the hierarchical entries of all the input records to find the most common themes and labels the entries accordingly. The process step classification module 504 may utilize any appropriate algorithm for labeling the hierarchical entries.

The process map generation module 506 takes the time-ordered themes generated by the process step classification module 504 as input and creates a normalized sequence of themes performed for each original record. For example, as shown in Box 13 of FIG. 4, the transactions of Box are encoded with the themes of Box 10. The process map generation module then iterates over the time-ordered themes from all the records to create a process map that contains a complete set of time-ordered themes. For example, for each transaction, a node may be created to correspond to a step or theme. These nodes may be connected by edges to represent an order in which the steps or themes are performed. This process may iterate until a map has been fully populated covering all the themes.

The process consistency checker module 508 may verify that nodes in the process map (the sequence of themes) are consistent with actual sequences of events in transactions. According to one aspect, the functions of the process consistency checker module 508 may be semi-automated. For example, the process consistency checker module 508 may request input from a user verifying whether a new theme pattern is consistent with the understood operations and should be integrated with the process flow map, or the theme pattern represents an error.

The output processing module 510 produces the resulting maps in standard industry formats, such as Business Process Execution Language (BPEL), Visio, Extensible Markup Language (XML) and other formats. The process map may then be easily integrated into the various enterprise tools.

Figure 6A:
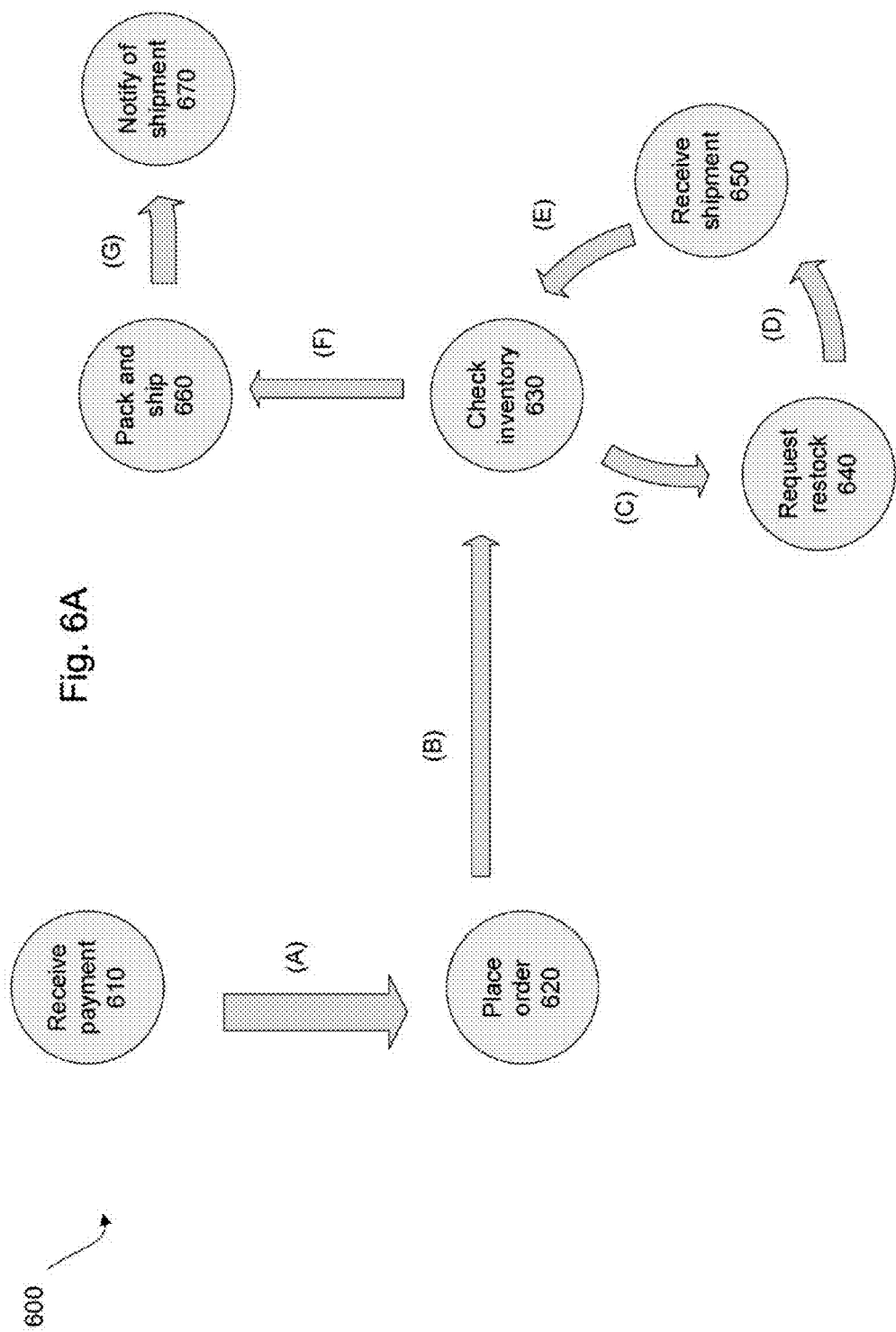
FIGS. 6A-6C illustrate exemplary process flow maps produced according to aspects of the invention.

An example of a workflow model 600 created using the above-described system and method is illustrated in FIG. 6A. It should be understood that this workflow is merely exemplary, and that workflows of various types (graphs, charts, Petri nets, etc.) having various representations may be used. Additionally, the example of FIG. 6A is highly simplified. Workflows generated according to aspects of the invention may be far more complex, representing processes within a much larger enterprise.

As shown, nodes 610-660 represent different operations within a process. The nodes may be generated, for example, using the themes identified during process classification. Relating back to FIG. 1, the operations represented by nodes 610-670 may be performed by any individual or group within an enterprise, such as the departments 110-150. For example, while a check inventory operation may be performed by the warehouse 140, a pack and ship operation may be performed by the shipping department 130. Each of the nodes may be connected, for example, by arrows (A)-(G). The direction of the arrows and relationship created by the arrows between the nodes 610-670 may be determined using timing information relating to the operations and extracted from the operational data.

According to the example of FIG. 6A, a payment received operation is represented by node 610, after which placement of the order is represented by node 620. A subsequent check inventory operation is represented by node 630. If the ordered item is in stock, a pack and ship operation may follow, represented by node 660, followed by the sending of a shipment notification, represented by node 670. However, if the ordered item is not in stock, a restock may be requested at node 640, and receipt of a shipment of the restock may be represented by node 650.

The workflow model 600 of FIG. 6A may represent how processes within the enterprise are most commonly performed. For example, a number of transactions or instances may have been analyzed in order to generate the flow. While some of those instances may have included special circumstances that require additional, fewer, or different processes to be performed, the majority of instances may have followed the workflow model 600. According to one aspect, any of the individual instances used to generate the workflow model 600 may be selected and viewed by a user.

Figure 6B:
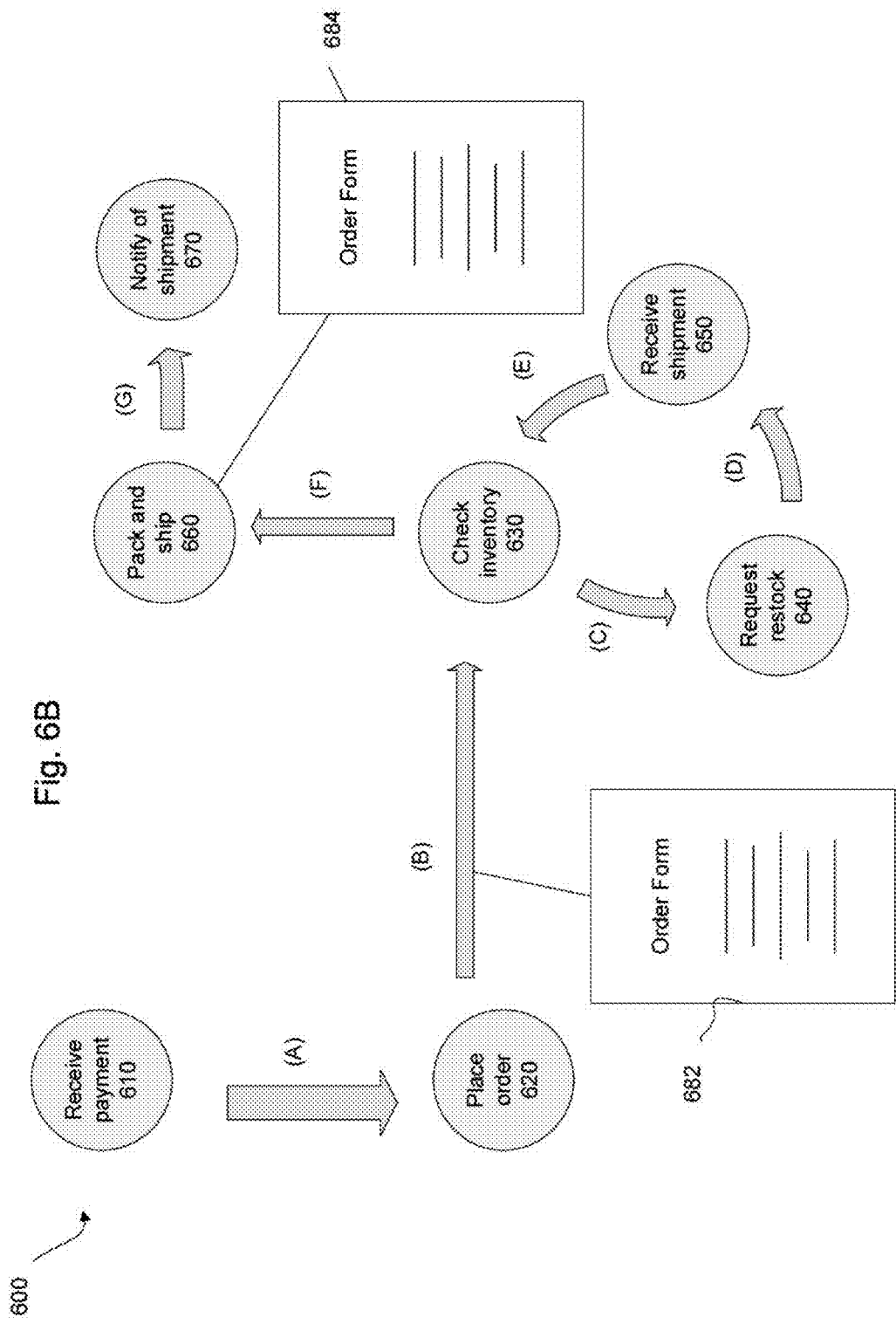

As shown in FIG. 6B, records may be mapped to the workflow 600 in various ways. For example, an order form 682 may be mapped to arrow (B) of the workflow 600. The order form 682 may be called from the workflow 600 in any number of ways, such as double clicking arrow (C), entering a search query, or the like. The order form 682 may include, for example, text from an accounting department indicating that payment was received, and text from the sales department placing the order for goods. Accordingly, a supervisor, executive, or other individual overviewing the operations of the enterprise may determine whether the departments involved in the transaction of goods are performing their responsibilities properly.

According to another example, order form 684 may be retrieved from the workflow 600. The order form 684 may be mapped, for example, to node 660. Accordingly, the order form 684 may include text similar to the order form 682, but may also include indicia from a warehouse indicating that the ordered item is in stock, and indicia from the packing and shipping department indicating the shipping method, times, tracking number, etc.

Figure 6C:
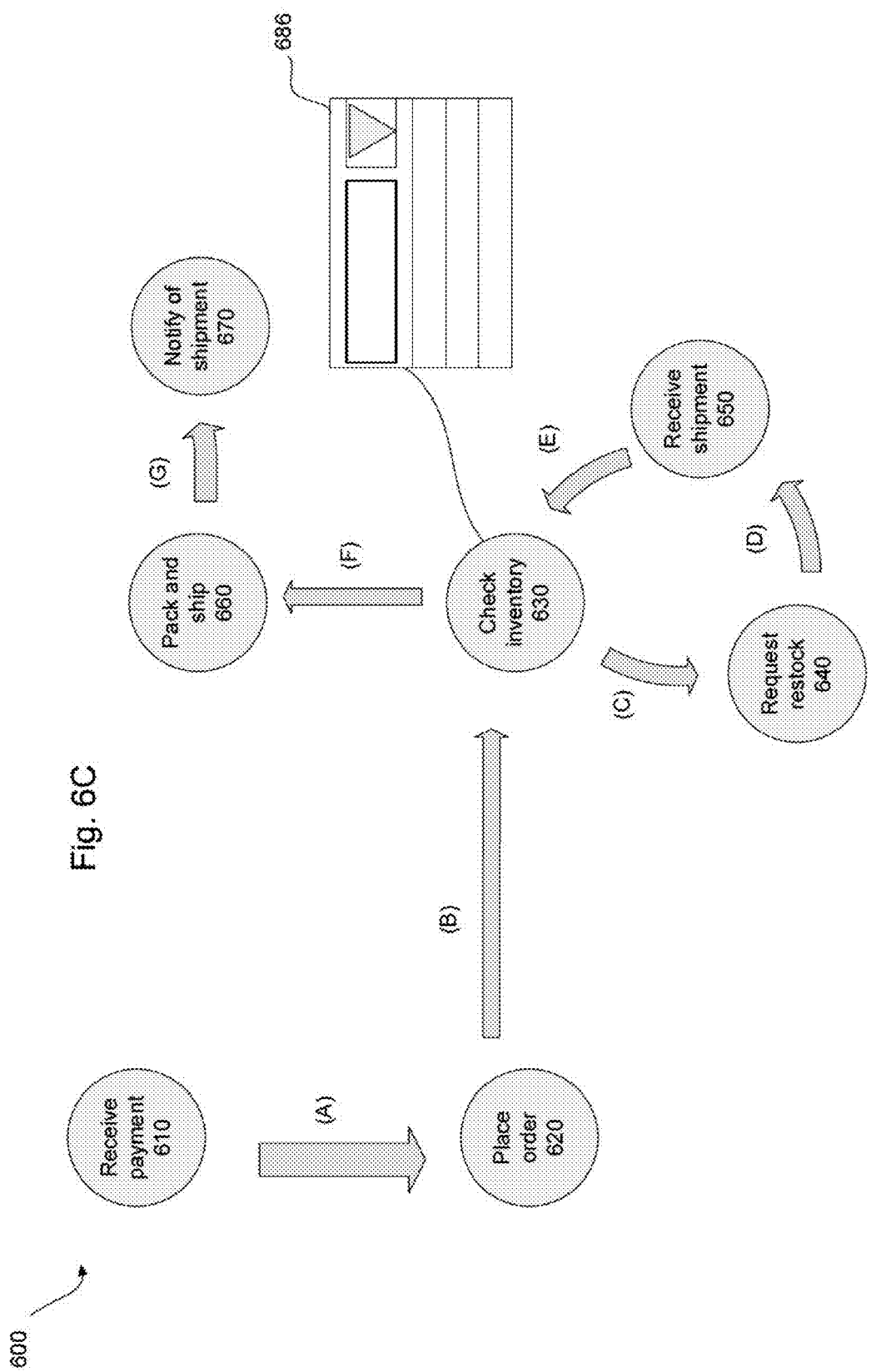

According to a further example, metrics or other derived information may be mapped to the flow 600. Additional attributes may be added to the transaction to represent the derived information. By way of example only, the flow 600 may indicate how many orders for good were "in stock" in the warehouse, how many times the shipping department shipped the ordered goods on time, or how many times a customer contacted the customer service department to check the status of the order. Such information may be represented by the flow 600 on its face, or may be made available to a user by, for example, selecting a particular portion the flow 600 or making a selection from an associated menu. For example, as shown in FIG. 6C, a drop down menu 686 may be associated with the check inventory node 630. Accordingly, this menu 686 may provide metrics relative to the check inventory operation. For example, the menu 686 may include information regarding how many orders were in stock, how many orders were filled in a predetermined time span, whether any inventory was damaged, how long it took to check the inventory in each instance, etc.

FIG. 7 provides a flow diagram illustrating a method 700 for automatically generating workflows according to another aspect of the technology. It should be understood that the steps of the method 700 need not be performed in the precise order described below. Rather, various steps can be handled in a different order or simultaneously. Moreover, steps may be added or removed.

In block 710, operational data for various events is received. The operational data may include any variety of records, such as work orders, receipts, tickets, invoices, inquiries, etc. Each record may correspond to one or more events. An event may include all the occurrences involved in a transaction. For example, a transaction may be a driver requesting automotive repair service, a patient seeking medical attention at a health care facility, preparation of a legal document at a law firm, management of retirement funds at a financial service, etc. Using the example of a patient seeking medical attention, the events may include setting an appointment, checking in with receptionist, providing insurance information, sending patient to examination room, recording symptoms, recording diagnosis, and prescribing medication.

The operational data may be received at one or more processors. For example, according to one aspect, the data may be received at a server connected to a network, such as the server 160. According to another aspect, the data may be received at a number of individual computers, where further processing may occur. According to yet another aspect, the data may be uploaded to a secure remote storage medium, for example, through a web-based service.

Preferably, privacy protections are provided for the data including, for example, anonymization of personally identifiable information, aggregation of data, filtering of sensitive information, encryption, hashing or filtering of sensitive information to remove personal attributes, time limitations on storage of information, or limitations on data use or sharing. Preferably, data is anonymized and collected in the aggregate such that individual user data is not revealed.

In block 720, the operational data may be converted to hierarchical form. For example, the record may be converted to structured elements, a time-ordered sequence of text segments added to the record over its lifetime, and stemmed text sequences. In block 730, the data may be classified into groups. For example, a record relating to medical services provided to a patient may include various events grouped into "Patient's Complaint," "Medical History," "Diagnosis," and "Prescribed Medications."

In block 740, a flow may be created for each transaction within a predefined time range. For example, at a medical facility, a flow may be generated for each patient that seeks medical attention from the facility or from an area within the facility (e.g., the emergency room), over the course of a two week period. Accordingly, a great number of individual flows may be generated in this block. The flow may include a number of nodes, e.g., corresponding to the groups classified in block 730, and a number of edges interconnecting the nodes.

In block 750, a representative flow graph may be formed from the individual flows generated in block 740. For example, the most common nodes from the individual flows created in block 740 may be used to form the representative flow. Accordingly, continuing the example above for the medical facility, if a "Diagnosis" node is followed by a "Prescribed Medications" node in 12 instances out of 15, these two nodes may be used in the representative flow.

In block 760, the operational data may be mapped to the flow (e.g., the individual flows created in block 740 and/or the representative flow created in block 750). Thus, for example, a user may easily locate and view the records relevant to particular occurrences in the flow.

In block 770, the representative flow graph may optionally be verified. For example, a user familiar with the processes in the enterprise may review the flow graph to ensure that there are no errors, redundancies, etc.

The system and method for generating workflows described above may be beneficial in a number of aspects. For example, the described system and method may be used to detect deviations from standard or intended process steps, and to evaluate planned changes to workflow to assure that the intended effect occurs. Moreover, the system and method may be used to identify processes with sufficient volumes of work to permit task optimization, to detect timing variations within identical process workflows and root causes of such variations, and to validate that process training is effective by measuring improvements in cycle time and compliance. Even further, the method and system may be used to quantify the cost of supporting a certain type of hardware, and correlate changes in process step times to workflow orchestration tool outages or new releases.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims. Furthermore, while particular processes are shown in a specific order in the appended drawings, such processes are not limited to any particular order unless such order is expressly set forth herein.

The invention claimed is:

1. A method of generating workflows, comprising:
   receiving raw operational data relating to a plurality of events;
   converting the operational data into a hierarchical form including structured elements, a time-ordered sequence of text segments, and stemmed text sequences;
   determining from the converted operational data whether a type of the event is known or unknown, where known event types are maintained in a database of event type identifiers;
   updating the database of event type identifiers with a new event type identifier when the event type is unknown;
   assigning an event type identifier from the database to each type of converted operational data when the type of the event is known;
   identifying, using the processor, transactions using the time-ordered sequence of text segments and assigned event identifier, wherein a transaction is a sequence of events;
   encoding the transactions using the event type identifier;
   pruning incomplete transactions based on an ending event type identifier in the sequence;
   identifying themes common across the transactions, the themes including one or more of cycle, bottleneck, forks, joins, or branches;
   encoding the transactions with the themes;
   assigning weights to the themes in proportion to a number of events represented in the theme;
   generating, using the processor, a flow model using an aggregation of the weighted themed transactions;
   mapping, using the processor, the operational data to the flow model such that the operational data is available for viewing by accessing the map;
   identifying logical process groups within the flow model using clustering; and
   outputting the flow model and the identified logical process groups.

2. The method of claim 1, wherein generating the flow model further comprises:
   generating an individual flow model for each transaction; and
   combining the individual flow models to form a representative flow model.

3. The method of claim 2, wherein the operational data is mapped to the individual flow model for each transaction.

4. The method of claim 2, wherein the operational data is mapped to the representative flow model.

5. The method of claim 2, further comprising detecting deviations from the representative flow model.

6. The method of claim 1, further comprising:
   generating metrics related to the at least one transaction; and
   mapping the metrics to the flow model.

7. The method of claim 1, further comprising determining timing information associated with the transactions by reading timestamps from the raw operational data.

8. The method of claim 1, wherein outputting the flow model further comprises formatting the model for display on a conventional communication device.

9. The method of claim 1, further comprising reducing the flow model based on the logical process groups.

10. A system for generating workflows from operational data, comprising:
    one or more processors;
    a memory storing operational data relating to a plurality of events, and instructions executable by the one or more processors, the instructions including:
      converting the operational data into a hierarchical form including structured elements, a time-ordered sequence of text segments, and stemmed text sequences;
      determining from the converted operational data whether a type of the event is known or unknown, where known event types are maintained in a database of event type identifiers;
      updating the database of event type identifiers with a new event type identifier when the event type is unknown;
      assigning an event type identifier from the database to each type of converted operational data when the type of the event is known;
      identifying transactions using the time-ordered sequence of text segments and assigned event identifier, wherein a transaction is a sequence of events;
      encoding the transactions using the event type identifier;
      pruning incomplete transactions based on an ending event type identifier in the sequence;
      identifying themes common across the transactions, the themes including one or more of cycle, bottleneck, forks, joins, or branches;
      encoding the transactions with the themes;
      assigning weights to the themes in proportion to a number of events represented in the theme;
      generating a flow model using an aggregation of the weighted themed transactions; and
      mapping the operational data to the flow model such that the operational data is available for viewing by accessing the map.

11. The system of claim 10, wherein the memory stores the operational data across a number of devices.

12. The system of claim 10, further comprising a display for outputting the flow model.

13. The system of claim 10, further comprising an input device for receiving input from a user.

14. The system of claim 13, wherein the input includes a verification of one or more aspects of the flow model.

15. The system of claim 10, the instructions further comprising:
    generating metrics related to the at least one transaction; and
    mapping the metrics to the flow model.

16. The system of claim 10, the instructions further comprising reading timestamps from the operational data.

17. A non-transitory computer-readable storage medium comprising instructions that, when executed by a computer processor, cause the processor to perform a method comprising:

receiving raw operational data relating to a plurality of events;

converting the operational data into a hierarchical form including structured elements, a time-ordered sequence of text segments, and stemmed text sequences;

determining from the converted operational data whether a type of the event is known or unknown, where known event types are maintained in a database of event type identifiers;

updating the database of event type identifiers with a new event type identifier when the event type is unknown;

assigning an event type identifier from the database to each type of converted operational data when the type of the event is known;

identifying, using the processor, transactions using the time-ordered sequence of text segments and assigned event identifier, wherein a transaction is a sequence of events;

encoding the transactions using the event type identifier;

pruning incomplete transactions based on an ending event type identifier in the sequence;

identifying themes common across the transactions, the themes including one or more of cycle, bottleneck, forks, joins, or branches;

encoding the transactions with the themes;

assigning weights to the themes in proportion to a number of events represented in the theme;

generating, using the processor, a flow model using an aggregation of the weighted themed transactions;

mapping, using the processor, the operational data to the flow model such that the operational data is available for viewing by accessing the map;

identifying logical process groups within the flow model using clustering; and outputting the flow model and the identified logical process groups.

18. The computer-readable medium of claim 17, the method further comprising:

generating an individual flow model for each transaction; and combining the individual flow models to form a representative flow model.

19. The computer-readable medium of claim 17, the method further comprising:

generating metrics related to the at least one transaction; and mapping the metrics to the flow model.

\* \* \* \* \*